(12) United States Patent
Al Sayeed

(10) Patent No.: US 10,833,791 B1
(45) Date of Patent: Nov. 10, 2020

(54) REDUCING INTERFERENCE FROM CHANNEL HOLDERS IN AN OPTICAL LINK

(71) Applicant: Ciena Corporation, Hanover, MD (US)

(72) Inventor: Choudhury A. Al Sayeed, Stittsville (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/442,731

(22) Filed: Jun. 17, 2019

(51) Int. Cl.
*H04J 14/02* (2006.01)
*H04B 10/564* (2013.01)
*G02B 6/293* (2006.01)

(52) U.S. Cl.
CPC ........ *H04J 14/021* (2013.01); *G02B 6/29383* (2013.01); *H04B 10/564* (2013.01); *H04J 14/0206* (2013.01); *H04J 14/0221* (2013.01); *H04J 14/0201* (2013.01); *H04J 14/0202* (2013.01); *H04J 14/022* (2013.01); *H04J 14/0208* (2013.01); *H04J 14/0213* (2013.01); *H04J 14/0215* (2013.01)

(58) Field of Classification Search
None
See application file for complete search history.

(56) References Cited

U.S. PATENT DOCUMENTS

| | | | |
|---|---|---|---|
| 6,031,647 A | 2/2000 | Roberts | |
| 6,304,347 B1 | 10/2001 | Beine et al. | |
| 6,522,803 B1 | 2/2003 | Nakajima et al. | |
| 6,563,614 B1 * | 5/2003 | Stephens | H04B 10/0775 398/136 |
| 6,771,905 B1 * | 8/2004 | Bortz | H04J 14/02 398/45 |
| 6,907,201 B1 * | 6/2005 | Frankel | H04B 10/296 385/24 |
| 6,959,149 B2 | 10/2005 | Bragg et al. | |
| 7,483,205 B1 | 1/2009 | Lundquist et al. | |
| 8,126,330 B2 * | 2/2012 | Wisseman | H04J 14/0212 398/2 |
| 8,509,621 B2 | 8/2013 | Boertjes et al. | |
| 8,909,038 B2 | 12/2014 | Cannon et al. | |
| 8,971,705 B2 | 3/2015 | Boertjes et al. | |
| 9,197,322 B2 | 11/2015 | Boertjes et al. | |

(Continued)

*Primary Examiner* — Darren E Wolf
(74) *Attorney, Agent, or Firm* — Clements Bernard Walker; Lawrence A. Baratta, Jr.; Christopher L. Bernard

(57) ABSTRACT

Systems and methods are provided for reducing interference when optical signals are added. One embodiment includes a method for adding an optical channel for communicating data and having a bandwidth within an optical spectrum for transmission along an optical link of an optical network. The method includes creating a lower frequency holding zone having a lower frequency bandwidth adjacent to the bandwidth of the added optical channel and including at least one lower frequency sub-slice having a power spectral density that varies throughout the lower frequency sub-slice. Also, the method includes creating a higher frequency holding zone having a higher frequency bandwidth adjacent to the bandwidth of the added optical channel and including at least one higher frequency sub-slice having a power spectral density that varies throughout the higher frequency sub-slice. The lower frequency holding zone and the higher frequency holding zone are dynamically configured with respect to fiber and channel requirements.

20 Claims, 9 Drawing Sheets

(56) References Cited

U.S. PATENT DOCUMENTS

| | | | |
|---|---|---|---|
| 9,252,913 B2 | 2/2016 | Al Sayeed et al. | |
| 9,276,696 B2 | 3/2016 | Al Sayeed et al. | |
| 9,344,191 B2 | 5/2016 | Al Sayeed et al. | |
| 9,419,708 B2 | 8/2016 | Rad et al. | |
| 9,768,902 B2 | 9/2017 | Al Sayeed et al. | |
| 9,906,294 B2 | 2/2018 | Al Sayeed et al. | |
| 9,985,726 B1 | 5/2018 | Al Sayeed et al. | |
| 2003/0106990 A1 | 6/2003 | Tomofuji et al. | |
| 2008/0285973 A1 | 11/2008 | Uchiyama et al. | |
| 2008/0304829 A1 | 12/2008 | Sato | |
| 2010/0008672 A1* | 1/2010 | Kovsh | H04J 14/0205 398/85 |
| 2011/0200322 A1* | 8/2011 | Kovsh | H04J 14/0209 398/2 |
| 2013/0004166 A1 | 1/2013 | Okada | |

\* cited by examiner

REDUCING INTERFERENCE FROM CHANNEL HOLDERS IN AN OPTICAL LINK

TECHNICAL FIELD

The present disclosure generally relates to optical communication networks. More particularly, the present disclosure relates to optical links within an optical network and systems and methods for reducing interference in an optical link caused by the addition of channel holders for filling the optical spectrum.

BACKGROUND

In an optical communication system or network, optical signals having specific spectral characteristics are generally transmitted from one end of an optical transmission line (e.g., fiber optic cable) to a receiving end, where the optical signals can be decoded. Normally, the optical signals include a predetermined frequency band or spectrum, which may contain at least modulated data along with other signals. For example, empty bandwidth slots are typically filled with channel holders that are designed to equalize the power along the entire spectrum. Channel holders are also configured to reduce noise.

Optical networks usually include Optical Add/Drop Multiplexers (OADMs) for adding or dropping channels at various points or nodes within the optical network. Using a process known as Amplified Spontaneous Emission (ASE), optical signals can be generated and transmitted through the optical network, but these signals will naturally tend to diminish over the length of the optical fibers. Thus, the optical signals can be optically amplified using lasers and/or other suitable components to increase the strength of the attenuated optical signals. Each optical link or section of the optical network may be used to relay the optical signals and use ASE to maintain the power (i.e., Power Spectral Density (PSD)) of the signals.

ASE-based channel holders are injected or added at each optical section in the multiplexer portion of the OADM. The ASE channel holders are created to replicate the spectral shape of the optical signals and may be generated with or without modulation. The purpose of the channel holders is to fill in the spectrum so that each optical link remains fully filled from the point of view of the spectrum, while the loading of optical data within an optical section remains unchanged. Thus, ASE-based channel holders are injected locally to fill any unoccupied spectrum space, where there is no optical signal present.

When an optical signal is available from an upstream optical section, the spectrum space is switched from ASE to a traffic switch port to make adequate spectral space for the optical signal. With the optical spectrum fully-filled, channel holders can be launched with the same power level as the optical signals. The total power within each Optical Multiplex Section (OMS) or optical link can remain constant, even when the capacity of the optical signals' changes. Thus, the impact of Stimulated Raman Scattering (SRS), gain ripple, spectral tilt, Spectral Hole Burning (SHB), and other results of the OMS link can be kept relatively the same, resulting in a steady-state condition of the optical signals.

An ASE-based channel holder of an OMS is typically selected based on the architecture of the OADM at each individual optical link. Therefore, the channel holders from an upstream optical link can be blocked or dropped by a demultiplexer section of the new OADM in the optical link. New channel holders are added by a multiplexer of the OADM in order to improve channel isolation in the downstream direction.

An optical communication system may include a long chain of amplifiers that can be either gain-controlled or total-output-power (TOP) controlled in their respective OMS link. However, traditional ASE-based channel holders can provide a significant amount of interference for certain types of optical signals and certain types of fibers. For example, interference in the optical signals may affect the specific transmission modes (e.g., Baud rate, line rate, modulation format, etc.) in certain fiber types. The interference of the channel holders may not be an issue for all fiber types, but may introduce significant non-linear noise for certain fiber types, such as True Wave Reduced Slope (TWRS), True Wave Classic (TWC), Non-Zero Dispersion-Shifted Fiber (NZDSF), etc. For example, for the TWC fiber type, a non-QPSK signal can experience a non-linear noise of about one dB when propagated over a distance of about 1000 km, if the neighboring channel holders remain on the same power level as the power of the optical signals.

There is therefore a need to provide channel holders that provide the usual benefits that channel holders can normally provide, while, at the same time, reducing the interference that is common with conventional channel holders to offer advantages that typical channel holders are currently unable to offer.

BRIEF SUMMARY

Systems and methods for reducing interference caused by the introduction of channel holders in the optical spectrum of a propagated optical signal are described in the present disclosure. According to one embodiment, a method comprises the step of adding an optical channel having a bandwidth within an optical spectrum for transmission along an optical link of an optical network, where the optical channel is configured to communicate data. The method further includes the step of creating a lower frequency holding zone having a lower frequency bandwidth adjacent to the bandwidth of the added optical channel. The lower frequency holding zone includes one or more lower frequency sub-slices having a power spectral density that varies throughout the lower frequency sub-slice(s). Also, the method includes the step of creating a higher frequency holding zone having a higher frequency bandwidth adjacent to the bandwidth of the added optical channel. The higher frequency holding zone includes one or more higher frequency sub-slices having a power spectral density that varies throughout the higher frequency sub-slice(s). In this embodiment, the lower frequency holding zone and the higher frequency holding zone are dynamically configured with respect to link budget requirements and/or available signal-to-noise ratio (SNR) margins of the optical channel.

According to another embodiment, an Optical Add/Drop Multiplexer (OADM) of an optical communication system is described. The OADM includes an optical amplifier configured to amplify power of an added channel on an optical link; and a controller configured to cause injection of one or more channel holders adjacent to the added channel for transmission along the optical link, detect, via an optical signal detector, characteristics of the optical signal of the added channel in the optical link, cause generation of one or more holding zones for channel holders around each active channel, and cause variation of the shape of the power spectral density of the one or more channel holders within the holding zones.

According to yet another embodiment, an optical communication system is provided, wherein the optical communication system includes a transmitter for transmitting one or more optical signals over one or more fiber optic cables. The optical communication system further includes a receiver for receiving the one or more optical signals from the one or more fiber optic cables. One or more optical add/drop multiplexers (OADM) are also included, wherein each OADM is configured to perform various functions. For example, each OADM is configured to add an optical channel having a bandwidth within an optical spectrum for transmission along an optical link of the one or more fiber optic cables, dynamically create a lower frequency holding zone having a lower frequency bandwidth adjacent to the bandwidth of the added optical channel, the lower frequency holding zone including one or more lower frequency sub-slices having a varying power spectral density, and dynamically create a higher frequency holding zone having a higher frequency bandwidth adjacent to the bandwidth of the added optical channel, the higher frequency holding zone including one or more higher frequency sub-slices having a varying power spectral density.

BRIEF DESCRIPTION OF THE DRAWINGS

The present disclosure is illustrated and described herein with reference to the various drawings, in which like reference numbers are used to denote like system components and method steps, as appropriate, and in which.

DETAILED DESCRIPTION

The present disclosure relates to systems and methods for communicating optical signals within an optical communication system. The optical signals can be amplified through the optical communication system by a process referred to as Amplified Spontaneous Emission (ASE). In addition to amplifying the data portion of the optical signals, the ASE process may also include filling unused bandwidth with channel holders for maintaining a certain power level throughout the usable spectrum. The present disclosure describes an improvement over conventional ASE channel holding techniques by substantially maintaining the target total launch power, while further providing the benefit of reducing the interference that the channel holders may normally cause to the useful optical data signals.

The systems and methods described in the present disclosure may be used in a Reconfigurable Line System (RLS). The channel holder creation and injection systems for adding channel holders based on ASE operations may be used in multiple optical links along the lengths of various optical transmission paths. The systems and methods, according to some embodiments, may operate with optical signals in the C-band (i.e., 1527 nm to 1565 nm band), L-band (i.e., 1565 nm to 1625 nm band), C+L-band (i.e., 1527 nm to 1625 nm band), or in other suitable transmission frequency bands, which may be transmitted along fiber optic cable or other suitable light wave transmission medium. To increase the length of transmission without significant attenuation in certain fiber types and for certain fiber transmission modes, the non-linear noise propagation is reduced by the systems and methods described herein. Also, the reduction of the interference is taught in the present disclosure without abolishing the benefits that channel holders have originally been designed to offer.

Figure 1:
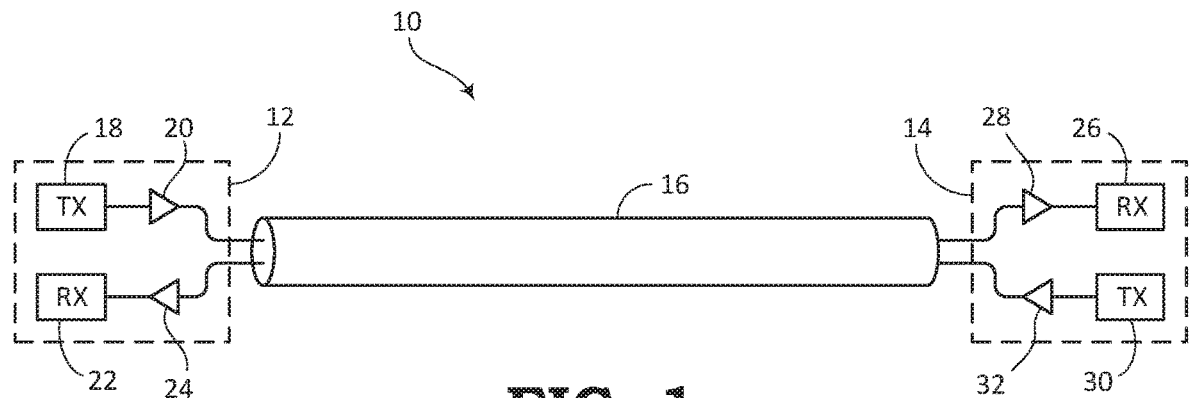
FIG. 1 is a block diagram illustrating an optical communications network according to various embodiments of the present disclosure.

FIG. 1 is a schematic block diagram showing an embodiment of an optical communication system 10. The optical communication system 10 includes a first end node 12 and a second end node 14 configured to communicate with each other via an optical network 16. In this embodiment, the first end node 12 includes an optical transmitting device (TX) 18 configured to transmit optical signals along the optical network 16 via an optical amplifier 20. The first end node 12 further includes an optical receiving device (RX) 22 configured to receive optical signals via the optical network 16 and another optical amplifier 24. Similarly, the second end node 14 includes an optical receiving device (RX) 26 configured to receive optical signals via the optical network 16 and through another optical amplifier 28. The second end node 14 further includes an optical transmitting device (TX) 30 configured to transmit optical signals along the optical network 16 via another optical amplifier 32. In one implementation, the TX 18 of the first end node 12 may transmit optical signals that are received by the RX 26 of the second end node 14 and the TX 30 of the second end node 14 may transmit optical signals that are received by the RX 22 of the first end node 12.

As illustrated in FIG. 1, the optical communication system 10 is configured for two-way communication, where the first and second end nodes 12 and 14 are each able to transmit and receive optical signals. In other embodiments, the optical communication system 10 may be configured as a one-way system where optical signals are transmitted in only one direction, such as from the first end node 12 to the second end node 14. According to some embodiments, the optical communication system 10 may include additional nodes for transmitting/receiving optical signals to/from the first and/or second end nodes 12, 14. Other configurations and arrangements of the optical communication system 10 are contemplated in the present disclosure.

In some embodiments, the optical network 16 may include any number of fiber optic cables, optical fibers, or other suitable types of optically transmitting paths. The optical network 16 may also include other components, such as optical amplifiers for amplifying and relaying the optical signals, multiplexers for adding optical channels within the optical spectrum of the transmitted optical signals, demultiplexers for removing or dropping optical channels, optical add/drop multiplexers (OADMs), and/or other suitable components for enabling communication between the nodes (e.g., first and second end nodes 12, 14). Additionally, the optical network 16 may be divided into multiple sections, segments, or optical links, where each optical link represents a length of one or more optical transmission paths and related optical components for adding or dropping channels, amplifying signals, etc. For example, in a submarine optical system (e.g., a trans-Atlantic optical communication system), the optical network 16 may include multiple optical amplifiers to account for attenuation over long lengths of underwater fiber optic cables.

Therefore, according to various embodiments of the present disclosure, an optical communication system (e.g., the optical communication system 10) is described. The optical communication system 10 may include a transmitter (e.g., transmitter 18 of the first end node 12) for transmitting one or more optical signals over one or more fiber optic cables (e.g., fiber optic cables of the optical network 16) and a receiver (e.g., receiver 26 of the second end node 14) for receiving the one or more optical signals from the one or more fiber optic cables. Also, the optical communication system 10 may include one or more optical add/drop multiplexers (OADMs), described below with respect to FIGS. 2-4, wherein each OADM is configured to add an optical channel having a bandwidth within an optical spectrum for transmission along an optical link of the one or more fiber optic cables. Each OADM is also configured to dynamically create a lower frequency holding zone having a lower frequency bandwidth adjacent to the bandwidth of the added optical channel, the lower frequency holding zone including one or more lower frequency sub-slices having a varying power spectral density, where a sub-slice is the minimum pixel attenuation or control resolution that a Wavelength Selective Switch (WSS) can support. Also, each OADM is configured to dynamically create a higher frequency holding zone having a higher frequency bandwidth adjacent to the bandwidth of the added optical channel, the higher frequency holding zone including one or more higher frequency sub-slices having a varying power spectral density. The optical communication system 10, in some embodiments, may be configured as a submarine transmission system. Each OADM multiplexer may be further equipped with an ASE generator at the switch input of the multiplexer that can be used to generate channelized ASE holders to lit up each Optical Multiplex Section (OMS) with full-fill spectrum.

Figure 2:
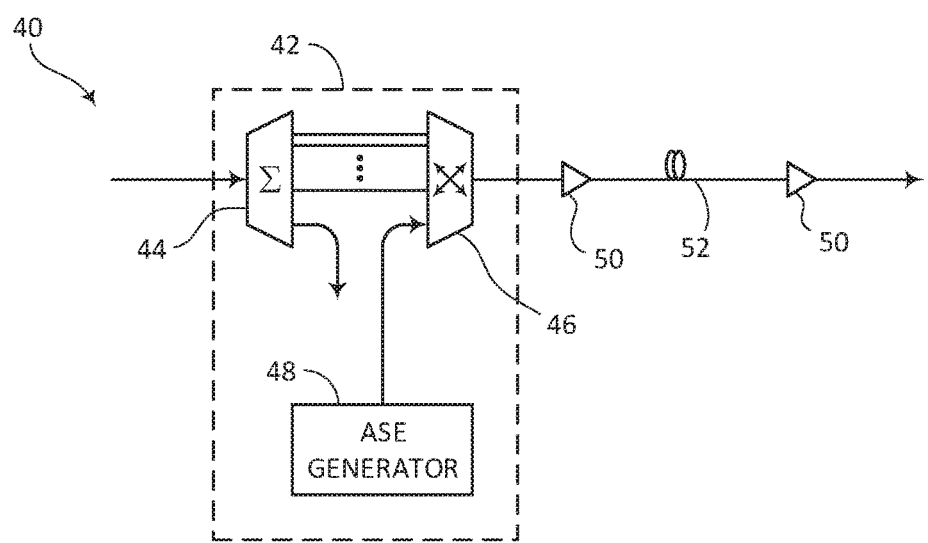
FIG. 2 is a diagram illustrating an optical link within the optical communications network of FIG. 1, according to various embodiments.

FIG. 2 is a schematic diagram illustrating an embodiment of an optical link 40 that may be part of the optical communication network 16 shown in FIG. 1 or part of any other suitable type of optical system. In this embodiment, the optical link 40 is shown in this figure with respect to a single optical fiber for transmitting signals in a direction from the left side of the page to the right. It should be recognized, however, that the optical link 40 may be bi-directional and include one or more additional sets of components, similar to the components shown in FIG. 2 for transmitting in the opposite direction (i.e., from right to left) and/or in other directions.

In the illustrated embodiment, the optical link 40 includes an Optical Add/Drop Multiplexer (OADM) 42 equipped with a Wavelength Selective Switch (WSS). As shown, the OADM 42 includes a demultiplexer unit 44 and a multiplexer WSS 46. Some channels may be configured to pass through the OADM 42 from the demultiplexer unit 44 to the multiplexer WSS 46 without being removed or dropped. According to various embodiments, the ASE generator 48 may be further configured to add one or more channels to the multiplexer WSS 46 of the OADM 42. The multiplexer WSS 46 of the OADM 42 may include one switch configured to transmit carved ASEs and other switches configured to transmit local or express traffic signals. The WSS can provide dynamic and flexible spectral shaping and is further configured to provide frequency specific switching functionality for ASE and traffic signals coming from different switch ports to a common line out port.

The multiplexed optical signal from the OADM 42 is supplied to one or more optical amplifiers 50 (e.g., Erbium Doped Fiber Amplifiers (EDFAs)) along the optical fiber 52. The number of optical amplifiers 50 may be a factor of the length of the optical fiber 52 and/or the fiber type. For example, if the optical fiber 52 is configured such that optical signals traversing the optical fiber 52 will experience a drop in power of about 1-3 dB over X km, then the optical link 40 may be arranged to include at least X optical amplifiers 50 so that the attenuated optical signals can be adequately amplified so as to have sufficient power to reach the next optical link with an adequate optical SNR.

According to the embodiments of the present disclosure, the ASE generator 48 is configured to create channel holders that are an improvement over conventional bandwidth filling techniques. The ASE generator 48 may be configured to create high power broadband ASEs at the switch input port of the multiplexer WSS 46, where the WSS on the multiplexer WSS 46 may be configured to create channel holders in a dynamic and flexible manner based on certain factors. The variability of the created channel holders includes different bandwidths of the channel holders and a number of sub-slices of bandwidth used for each channel holder. For example, the ASE generator 48 and the multiplexer WSS 46 may be configured to provide flexibility in the creation of launch power profiles or spectral shaping for channel holders as a function of neighboring traffic signals' transmission characteristics, such as a modulation format, Baud rate, and/or line rate. The flexibility with regard to creating the channel holders may also be a function of the type of fiber used in the span of the optical fiber 52.

Furthermore, the ASE generator 48 and the OADM multiplexer WSS 46 are configured to create the channel holders having an overall wave shape that is different from conventional bandwidth filling techniques. For example, the shape (i.e., peak) of the channel holder signal may include a gradual slope that is lowest (in power) at frequencies adjacent to the Media Channel (MC) and which includes full power at the other end of the band of the channel holder. Various channel holder frequency techniques are described in the present disclosure. The graphs shown in FIGS. 5, 6, 9, and 10 depict the ASE channel holders created by the ASE generator 48 according to various channel holder injection implementations of the ASE generator 48, described in greater detail below.

Figure 3:
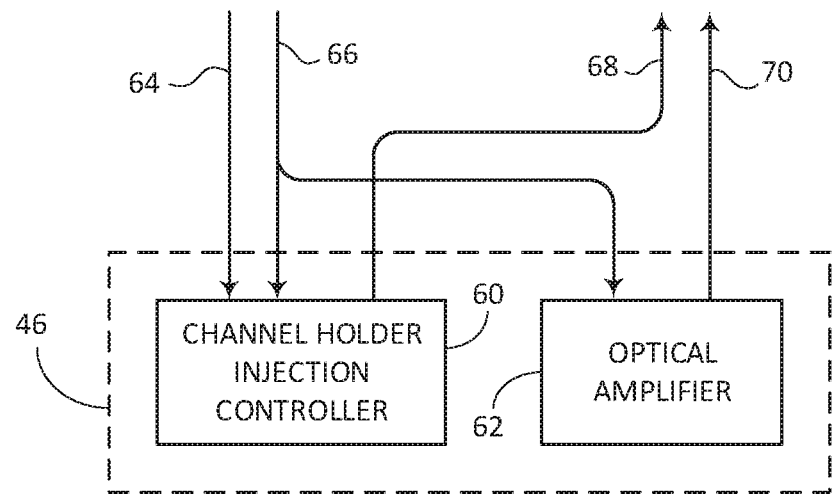
FIG. 3 is a block diagram illustrating a multiplexer WSS shown in the optical link of FIG. 2, according to various embodiments.

FIG. 3 is a block diagram showing an embodiment of the multiplexer WSS 46 utilizing the ASE generator 48 shown in FIG. 2. In this embodiment, the multiplexer WSS 46 includes a channel holder injection controller 60 and an optical amplifier 62 (e.g., EDFA). For example, the channel holder injection controller 60 is configured to receive old channel holders along path 64 from a previous optical link. Since each optical link with an optical communication network may be different and include different transmission characteristics and fiber characteristics, the old channel holders from an upstream optical link may not be applicable along the new optical link and may therefore be blocked. New channel holders can then be generated specifically for transmitting optical signals along the new optical link, and so on.

The channel holder injection controller 60 may also be configured to supply optical signals to the optical amplifier 62 for amplifying each of the channels, in accordance with the signal amplification processes described below with respect to FIGS. 9 and 10 regarding a preferred channel holder injection process, which includes increasing the power of the Media Channel (MC) while decreasing the power of the holder channels at frequencies adjacent to the MC, as described in more detail below.

In response to executing one of a number of possible processes for injecting channel holders, the channel holder injection controller 60 of the multiplexer WSS 46 shown in FIG. 3 is configured to supply newly created channel holders along path 68, which are multiplexed with other channels in the multiplexer WSS 46 of the OADM 42 shown in FIG. 2. The optical signals amplified by the optical amplifier 62, provided along path 70, are transmitted along with the channel holders along path 68, leading from the multiplexer WSS 46 and transmitted along the optical fiber 52 to the next optical link in the optical communication network 16.

Figure 4:
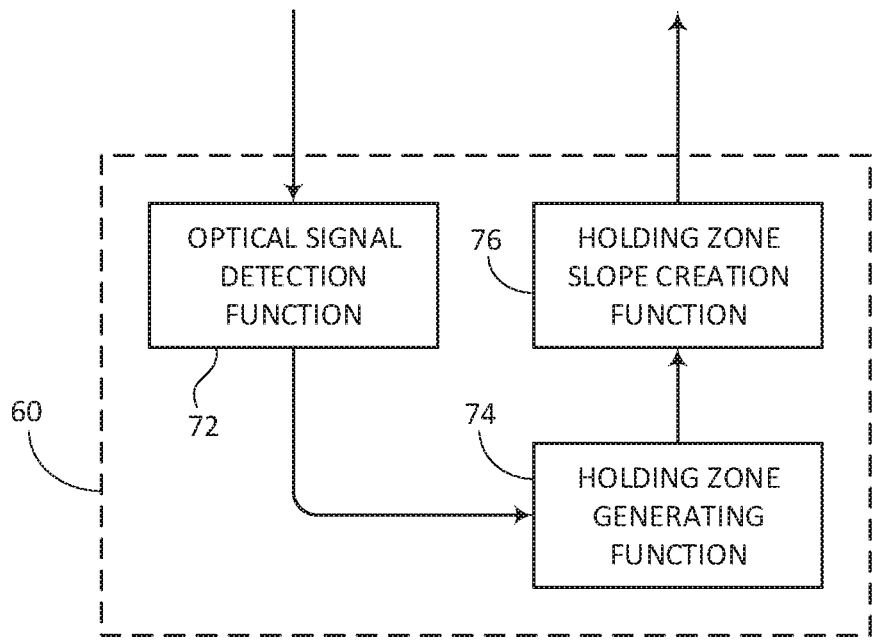
FIG. 4 is a block diagram illustrating functional blocks of a channel holder injection controller of the multiplexer WSS of FIG. 3 for use in the optical link of FIG. 2, according to various embodiments.

FIG. 4 is a schematic block diagram illustrating an embodiment of various means for performing the functions of the channel holder injection controller 60 shown in FIG. 3 and configured for use, for example, in the optical link 40 of FIG. 2. The functions of the controller 60 may utilize the ASE generator 48 and the OADM multiplexer WSS 46. The processes of shaping, sloping, and creating holding zones may be executed by the WSS on the backbone multiplexer WSS 46 or by a spectral shaping device, whereby the ASE generator 48 simply generates a broadband ASE. In the embodiment shown in FIG. 4, the channel holder injection controller 60 includes means for performing an optical signal detection function 72, a holding zone generating function 74, and a holding zone slope creation function 76. The optical signal detection function 72 may include the process of detecting the various channels on which the useful optical data signals will occupy portions of the entire spectrum of transmitted signals to be provided along the optical link 40. The optical signals may include those signals received from an upstream optical link and/or other channels that are to be added at the respective optical link 40.

Based on the location of the active channels of the optical signals within the spectrum, the holding zone generating function 74 may include the process of generating one or more holding zones, or channel holders, around each active channel. For example, the holding zone generating function 74 may include generating one or more filler channels on each side of the active data channels. The holding zone generating function 74 may also take into account other factors that may be specific to the respective optical link 40, such as signal transmission and fiber characteristics.

After holding zones are carved out by the holding zone generating function 74, the holding zone slope creation function 76 may be configured to include the process of altering the peak power of the holding zones, particularly for the portions or sub-slices of the holding zones adjacent to each side of each active data channel. The peak power may be altered by gradually (e.g., linearly) sloping the power from full power. For example, the shaping or altering of the holding zones may include sloping the peak from an edge of the holding zone or sub-slice thereof farthest away from the associated active channel band down to a decreased power level (e.g., 1 dB to 3 dB below full power) at an edge of the holding zone adjacent to the associated active channel band. The results of the interfering zone creation, interfering zone sloping process, and active channel amplification are shown in the graph of FIG. 10 and described in more detail below.

Therefore, according to one embodiment of the present disclosure, an OADM, such as the OADM 42 shown in FIG. 2, may be included in an optical communication system. The OADM may include a channel holder injection controller 60 configured to inject one or more channel holders adjacent to an added channel for transmission along an optical link. The OADM 42 may further include an optical amplifier 62 configured to amplify the power of the added channel.

Furthermore, the OADM 42 may also be configured in some embodiments such that the channel holder injection controller 60 includes an optical signal detection function 72 configured to include the process of detecting characteristics of the optical signal of the added channel. The channel holder injection controller 60 may further include a holding zone generating function 74 configured to include a process of generating the one or more channel holders to be injected adjacent to the added channel and a holding zone slope creation function 76 configured to include the process of varying the slope of the power spectral density of the one or more channel holders.

The holding zone generating function 74 may be configured to include the process of dynamically generating the shape for one or more channel holders' launch power profiles as a neighboring signals' function of a signal transmission mode of the optical link, the signals' transmission mode including at least one of a modulation format, Baud rate, and line rate. The holding zone generating function 74 may be configured to include the process of dynamically generating the one or more channel holders as a function of the type of fiber utilized within the optical link and/or the span of the fiber across the optical link.

Furthermore, the holding zone generating function 74 may be configured to include the process of creating a lower frequency holding zone having a lower frequency bandwidth adjacent to a bandwidth of the added channel and to create a higher frequency holding zone having a higher frequency bandwidth adjacent to the bandwidth of the added channel. The holding zone slope creation function 76 may be configured to include the function of partitioning the lower frequency holding zone to create a lower frequency sub-slice and to vary a power spectral density of the lower frequency sub-slice and may be further configured to partition the higher frequency holding one to create a higher frequency sub-slice and to vary a power spectral density of the higher frequency sub-slice. The holding zone slope creation function 76 may be configured to include the function of varying the power spectral density of the lower frequency sub-slice and the power spectral density of the higher frequency sub-slice such that the power decreases linearly as the respective sub-slice approaches the bandwidth of the added channel.

Figure 5:
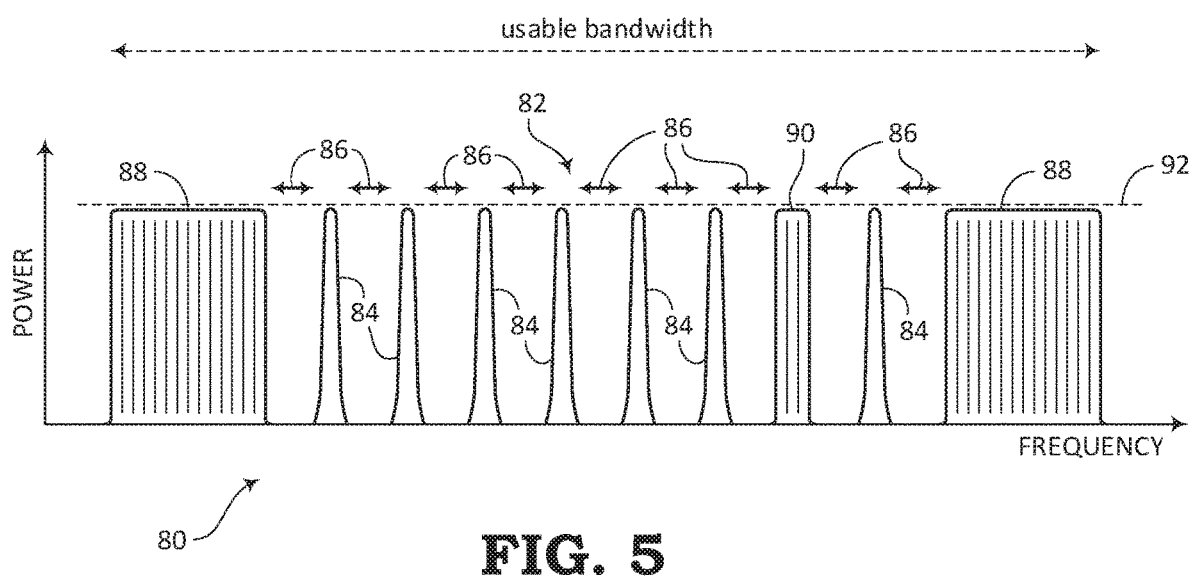
FIG. 5 is a graph showing a frequency spectrum resulting from the execution of a first channel holder injection process.

FIG. 5 is a graph 80 showing a frequency spectrum resulting from the execution of a first channel holder injection process when fixed spectral slots are used in the optical signals. The graph 80 includes a plot of the power (e.g., Power Spectral Density (PSD)) versus frequency along the bandwidth of the optical transmission signal 82 showing the traffic usable bandwidth where multiple channels can be divided. The graph 80 shows seven active channels 84 in this example where optical data signals carrying useful data are embedded. Although the active channels 84 are simply shown as a single wave (e.g., binary pulse), it should be noted that each channel 84 may include many waveform characteristics for carrying multiple detectable patterns. At channel locations where no active signals 84 are located along the bandwidth 82, channel holders (e.g., generated by an ASE channel holder injection controller) have been inserted to fill the empty spaces.

However, as shown in FIG. 5, some of the empty spaces are not filled. For example, instead of inserting channel holders adjacent to the active channels 84, empty slots 86 are left at the frequencies between the channels 84 and are unused or inactive. For example, the neighboring slots 86 have been removed and have not be added back. Channel holders 88 may be left in the spectrum at the ends where no active signals 84 are included and one intermediate channel holder 90 is shown in FIG. 5, but this channel holder 90 does not entirely fill the frequencies adjacent to the nearest channels 84.

To achieve this optical transmission signal 82, the ASE generation function (using the ASE generator 48 and the multiplexer WSS 46 of the OADM 42) is configured not to utilize the optical amplifier 62 for amplifying the active channels 84, but instead the sub-slice attenuations are adjusted to ensure the peak of the channels 84 is at a target PSD launch level 92. Also, the functions of the channel holder injection controller 60 do not include injecting additional channel holders, but instead simply includes removing channel holders closest to the active signals 84.

In a submarine optical communication system, positive dispersion (D+) fiber optic cables may be deployed having fixed spectral slots of 50 GHz. Interference from channel holders may become an issue for propagation in this environment. To reduce interference when a channel is added, channel holders adjacent to the added channel are simply removed. For example, two neighboring slots, each having a bandwidth of 50 GHz or 100 GHz (equivalent to 2x 50 GHz slots), on each side of the added channel are basically taken out of the traffic signal. This method may be applicable for fixed spectral slots in the ITU fixed 50 GHz grid with fixed grid capable hardware. Two 50 GHz slots, having a total width of 100 GHz, are created on each side of the added channel to form a large amount of empty space in the spectrum. However, with a total of 200 GHz worth of ASE power being lost to add a single 50 GHz traffic signal, a considerable amount of power is lost in the optical signal 82 with respect to a fully-filled spectrum.

In a worst case scenario with a spectrum 82 having 96 slots, where each slot is fixed with a 50 GHz band, if 19 channels are added in the spectrum and spread evenly throughout the spectrum, the channel holders from the entire spectrum can be taken out, resulting in 3800 GHz-worth of unused, empty slots. This technique, resulting in the graph 80 of FIG. 5, may be similar to processes used in conventional systems. However, the technique may be applied irrespective of signal or fiber type. A problem with the conventional technique is that the lost spectrum power was not being replaced by the new channel power until new capacities are added, which may create a problem with regard to the total power controlled submarine fiber spans, where it may be necessary to deploy additional tones to keep the total power stable as well as ensuring explicit channel planning to keep all traffic channels co-located in the spectrum to avoid additional ASE power loss.

If 48 ITU fixed-slot 50 GHz channels are added, then all ASE channel holders would be removed from the neighboring slots (e.g., in a C-band only system). This will have the same effect as if the ASE channel holder power is reduced by 3 dB as soon as the first traffic channel is added, which, in many environments, will not provide desirable results.

Currently, research is being made to investigate whether it may be possible to remove only one fixed 50 GHz slot for terrestrial links on each side of the added channel instead of the two slots (e.g., 100 GHz), which may be needed in submarine systems. Regardless, conventional methods normally cannot be applied for gain controller terrestrial links running with per span control without any dependency on an end-to-end sectional controller. Such terrestrial links cannot deploy additional tones in addition to ASE channel holders since that also breaks the flexibility on doing channel planning and spectrum assignment in a mesh optical network.

Each span is gain-controlled, and all gain/loss actuators are pre-calibrated with full-fill ASE channel holders. Thus, at a later time following a capacity change, if the total power coming to the fiber is less than that used in pre-calibration, then all the gain/loss actuators that were set earlier to compensate for span Stimulated Raman Scattering (SRS), spectral tilt, gain ripple, Spectral Hole Burning (SHB), and other results might be properly calibrated for the new optical link, whereby optimal performance will not be achieved.

In addition, with less total power into the fiber as a result of the first channel holder injection process (FIG. 5), when the signal capacity of the fiber changes, the pre-existing channels can experience a drop in the SNR which may not be originally budgeted (due to the impact of different SRS, tilt, ripple, and hole burning properties).

Figure 6:
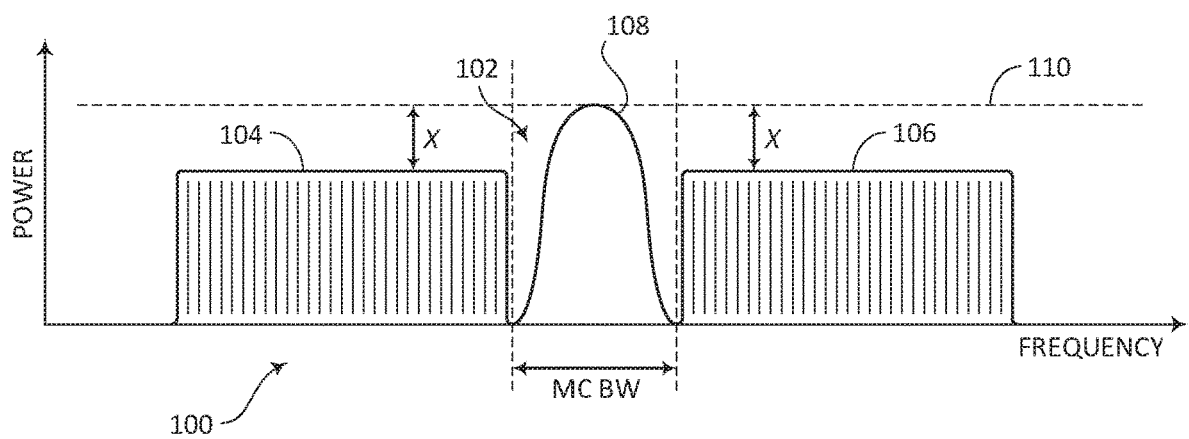
FIG. 6 is a graph showing a frequency spectrum resulting from the execution of a second channel holder injection process.

FIG. 6 is a graph 100 showing a frequency spectrum resulting from the execution of a second channel holder injection process. The graph 100 includes a plot of the power (e.g., Power Spectral Density (PSD)) versus frequency along a portion of the bandwidth of an optical transmission signal 102 showing one channel of the many channels from which the entire traffic usable bandwidth may be divided. In this embodiment, the ASE generator 48 shown in FIGS. 2-4 may be configured to utilize the adjacent frequencies for channel holders 104, 106 on opposite sides of the active channel 108. To reduce interference, the intensity (e.g., power or PSD) of the channel holders 104, 106 may be reduced by a certain amount X, such as 3 dB below the target PSD launch level 110.

To achieve this optical transmission signal 102, the ASE generator 48 of FIG. 3 is configured not to utilize the optical amplifier 62 for amplifying the active channel 108, but allows the peak of the channel 108 to remain at the target PSD launch level 110. The channel holder injection controller 60 injects channel holders 104, 106 adjacent to the active channel 108 according to conventional systems and further reduces the entire peak to a preset level (e.g., 3 dB below the target PSD launch level 110).

However, although this proposed solution provides the benefit of reducing interference, similar to the proposed solution suggested with respect to FIG. 5, the second channel holder injection process of FIG. 6 may suffer from a total drop in overall power in the signal 102 and therefor include the same problems mentioned above with respect to FIG. 5. Therefore, although the first and second channel holder injection processes discussed with respect to FIGS. 5 and 6 are able to reduce interference with added channels carrying the useful portion of the optical data, these solutions may not be able to offer the same benefits of channel holders that may be possible in other channel injection techniques. Therefore, other techniques, as described below with respect to FIGS. 9 and 10, may have a greater versatility for use with a greater number of fiber types and signal transmission characteristics.

Figure 7:
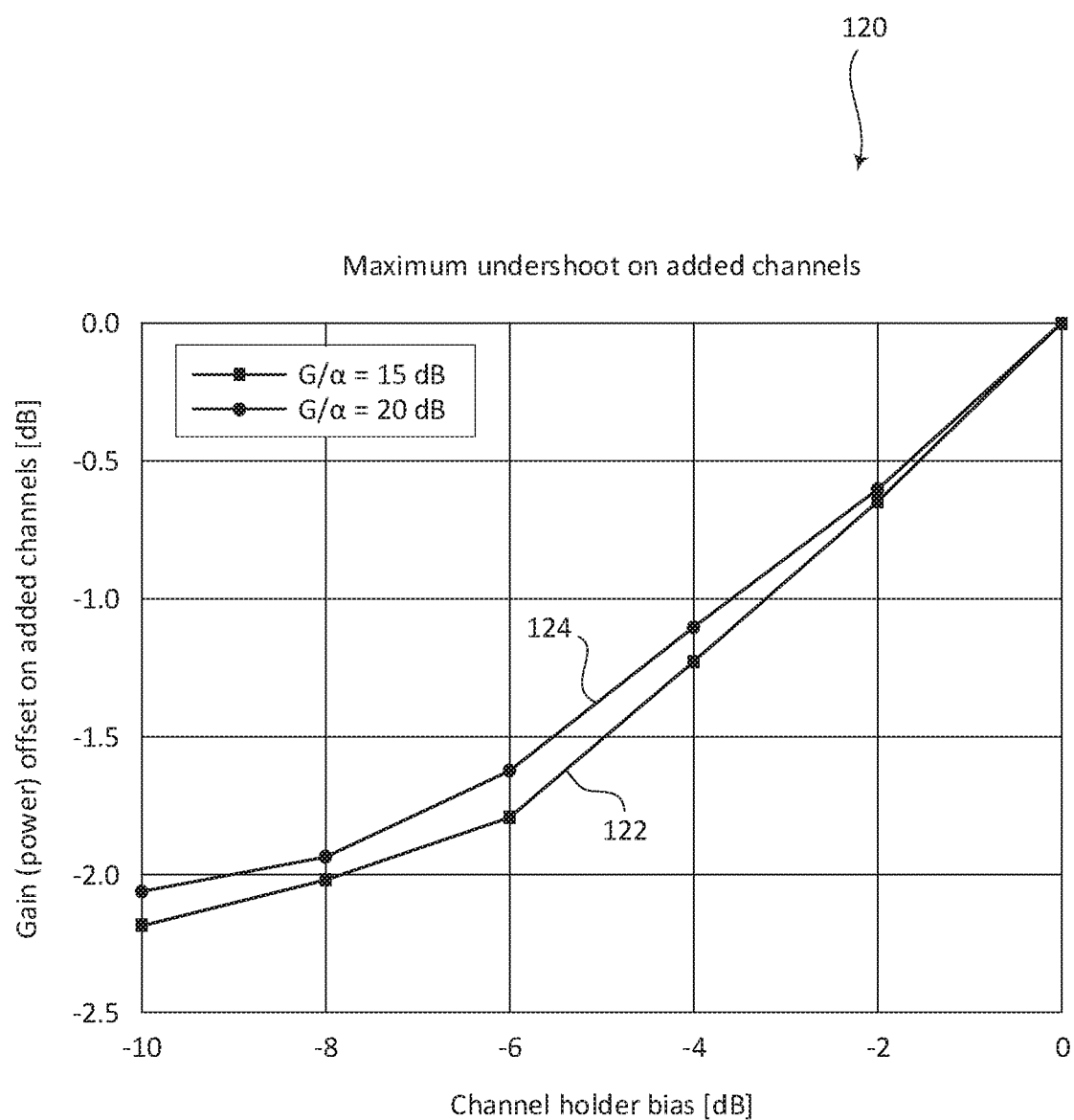
FIG. 7 is a graph showing the maximum undershoot resulting from the execution of the first and second channel holder injection processes of FIGS. 5 and 6.
Figure 8:
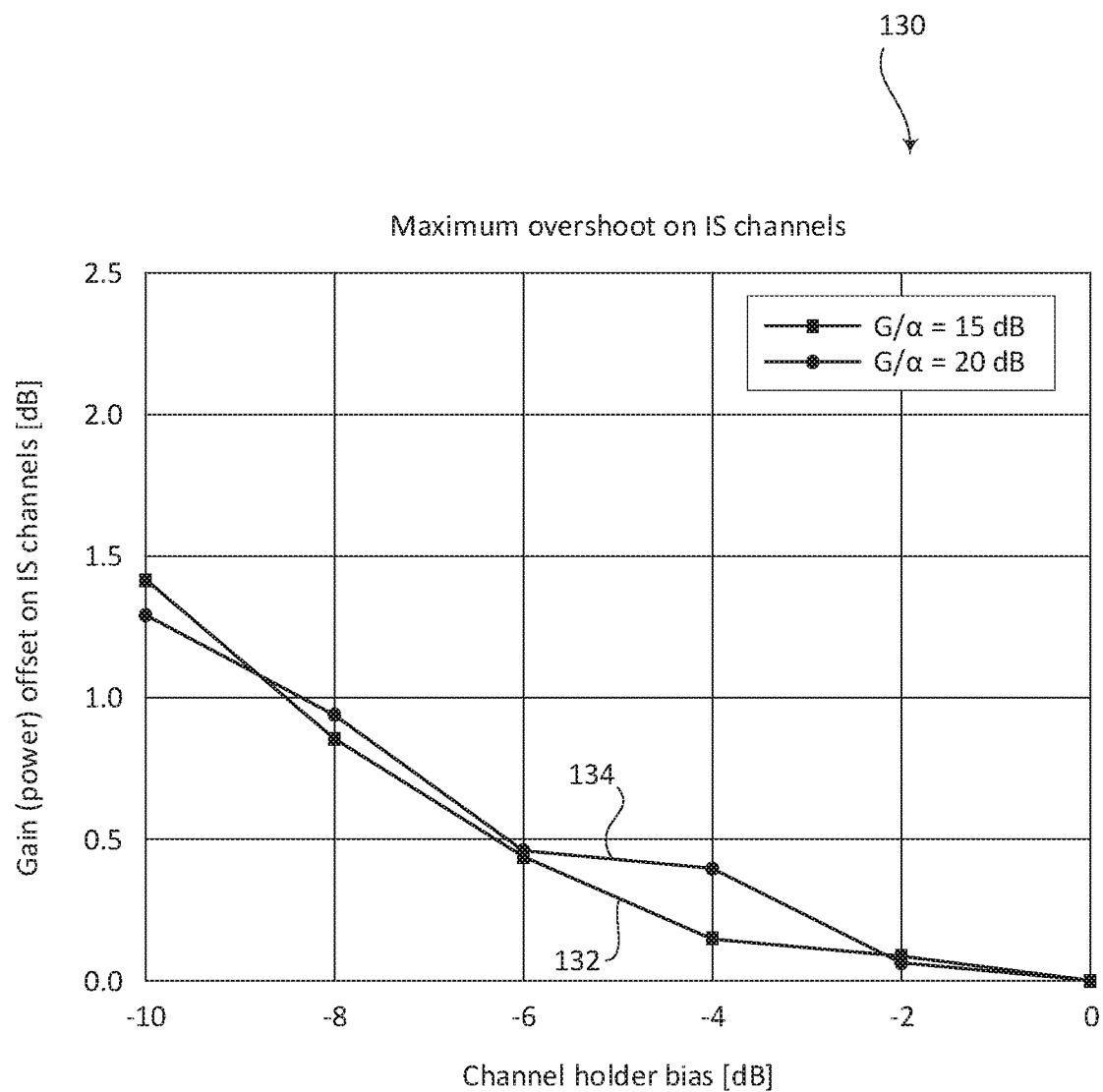
FIG. 8 is a graph showing the maximum overshoot resulting from the execution of the first and second channel holder injection processes of FIGS. 5 and 6.

FIG. 7 is a graph showing the maximum undershoot resulting from the execution of the first and second channel holder injection processes, the results of which are shown in FIGS. 5 and 6. Also, FIG. 8 is a graph showing maximum overshoot resulting from the execution of the first or second channel holder injection processes, the results of which are shown in FIGS. 5 and 6. The maximum undershoot (FIG. 7) and maximum overshoot (FIG. 8) are calculated based on gain (power) offset on an added channel (in dB) versus a channel holder bias (in dB) for gains of 15 dB and 20 dB.

As an example, one pre-existing channel may have a wavelength of 1554.13 nm, which corresponds to a frequency of 192.90 THz. Ten new channels may be added at the spectrum from 1530.33 nm (195.900 THz) to 1533.86 nm (=195.450 THz). The physical effects for each of seven optical amplifiers (e.g., EDFAs), or six fiber spans of optical links, are shown using the above-described techniques. The effects may be linear over the number of spans, which means that, over a 42 span network, the added channels will come up about 6 dB lower than their optimal receiving power target and can fail to carry on traffic following the adding of the channel. This will generate about 3 dB of power offsets on a pre-existing in-service channel.

Figure 9:
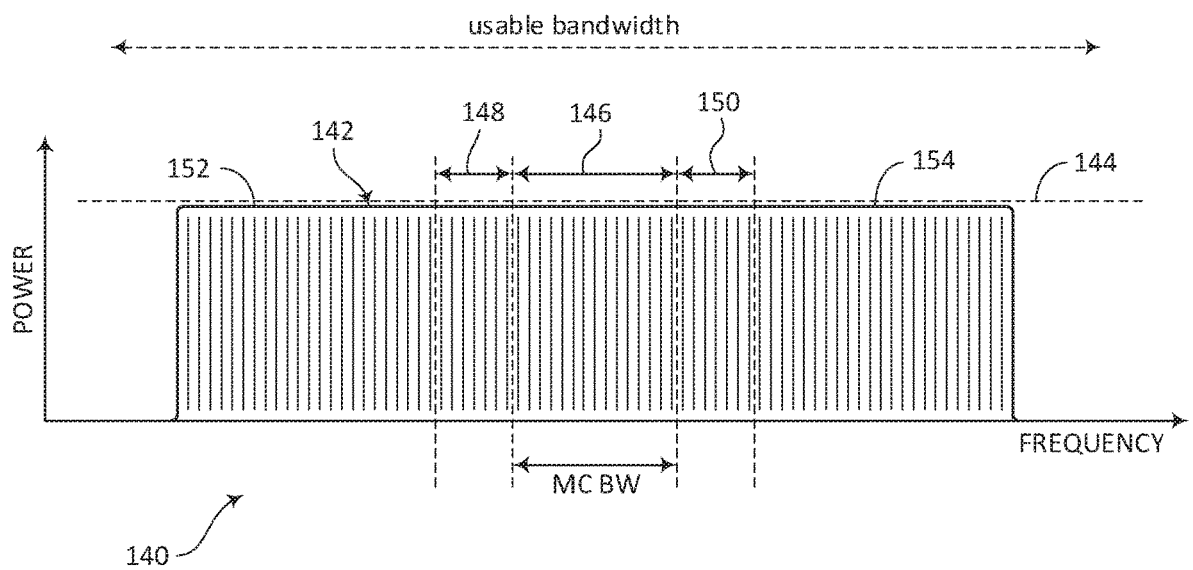
FIG. 9 is a graph showing a portion of a frequency spectrum before a third (preferred) channel holder injection process is executed.

FIG. 9 is a graph 140 showing a frequency spectrum 142 before a third channel holder injection process is executed. The frequency spectrum 142 peaks at the target PSD launch level 144 and includes only filled bandwidth with no active channels yet added. To add an active channel, the channel-holder-filled spectrum 142 is partitioned to include a Media Channel (MC) bandwidth zone 146 where the active channel will be added. Also, the process includes partitioning a first holding zone 148 adjacent to the MC bandwidth zone 146 including frequencies lower than the frequency band of the MC bandwidth zone 146. The process also includes partitioning a second holding zone 150 adjacent to the MC bandwidth zone 146 including frequencies higher than the frequency band of the MC bandwidth zone 146. One or more additional low frequency zones may be partitioned from the lower frequency portion 152 of the spectrum 142 and one or more additional high frequency zones may be partitioned from the higher frequency portion 154 of the spectrum 142.

Figure 10:
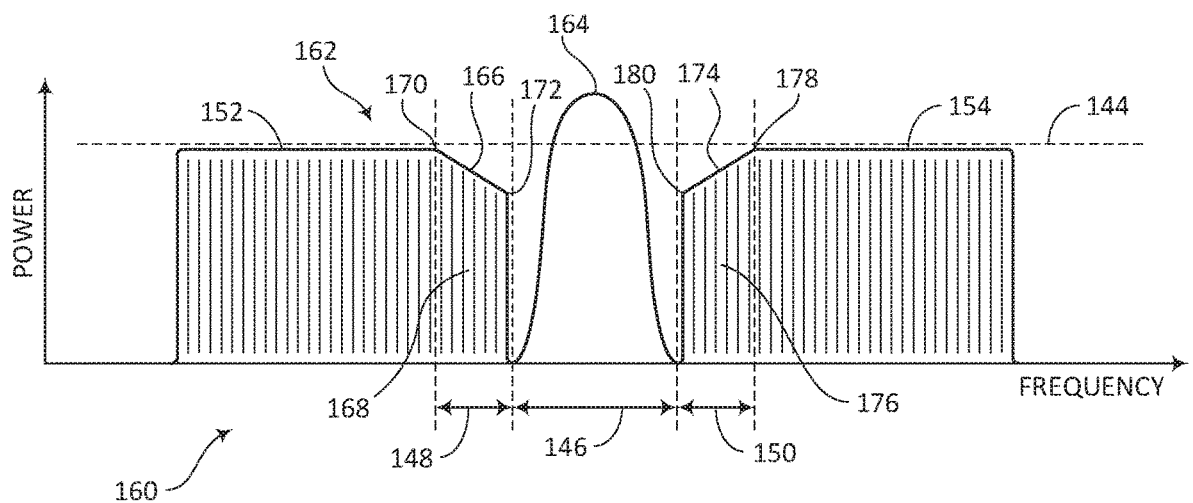
FIG. 10 is a graph showing the portion of the frequency spectrum of FIG. 9 resulting from the execution of the third (preferred) channel holder injection process.

FIG. 10 is a graph 160 showing a frequency spectrum 162 resulting from the execution of the third channel holder injection process. In this embodiment, the lowest partitions or zones of the lower frequency portion 152 and the highest partitions or zones of the higher frequency portion 154 are left unchanged from the original condition shown in FIG. 9. However, the MC bandwidth zone 146, first holding (or interfering) zone 148, and second holding (or interfering) zone 150 are altered. For example, the channel holder at the MC bandwidth zone 146 (shown in FIG. 9) is removed and the optical signal 164 is added. Also, the ASE generator 48 may utilize the optical amplifier 62 for amplifying the optical signal 164 such that the peak of the signal 164 exceeds the target PSD launch level 144.

In addition, the first and second holding zones 148, 150 may be changed by creating a slope that is inclined downward toward the optical signal 164 that occupies the MC bandwidth zone 146. In some embodiments, the slope of the channel holders in the first and second holding zones 148, 150 may be equal in magnitude, but opposite with respect to incline/decline. For example, the slope 166 of the channel holder 168 occupying the first holding zone 148 may decline from a peak 170 (e.g., at or near the target PSD launch level 144) at a lowest frequency of the channel holder 168 (that is farthest from the MC bandwidth zone 146) down to a decreased power level 172 at a predetermined level below the target PSD launch level 144 at the highest frequency of the channel holder 168 closest to (e.g., adjacent to) the MC bandwidth zone 146. Similarly, the slope 174 of the channel holder 176 occupying the second holding zone 150 may decline from a peak 178 (e.g., at or near the target PSD launch level 144) at a highest frequency of the channel holder 176 (that is farthest from the MC bandwidth zone 146) down to a decreased power level 180 at a predetermined level below the target PSD launch level 144 at a lowest frequency of the channel holder 176 closest to (e.g., adjacent to) the MC bandwidth zone 146.

In some embodiments, the peaks 170, 178 of the first and second channel holders 168, 176 may be the same. Also, the lowest levels 172, 180 of the first and second channel holders 168, 176 may also be the same. For instance, the lowest levels 172, 180 may be about 1 dB to about 3 dB below the target PDS launch level 144, or, according to alternative embodiments, may drop significantly below 3 dB. Also, the width of the frequency band of the first and second channel holders 168, 176 may also be the same. When these features of the channel holders 168, 176 are the same, their respective slopes 166, 174 may have the same magnitude but opposite sign. For example, the slopes 166, 174 may be linear from their outer edges 170, 178 farthest from the MC bandwidth zone 146 down to the inner edges 172, 180 closest to the MC bandwidth zone 146. According to other embodiments, the slopes 166, 174 may instead be non-linear and may include any suitable pattern that varies from the outer edges down to the inner edges.

To achieve the frequency spectrum 162 shown in FIG. 10, the ASE generator 48 may be configured to utilize the channel holder injection controller 60 and optical amplifier 62 as described above with respect to FIGS. 3 and 4. For example, the optical amplifier 62 is configured to boost the power of the optical signal 164 such that its peak exceeds the target PSD launch level 144 by an amount to compensate for the power lost in the process of reducing the channel holders 168, 176 within the first and second holding zones 148, 150, which are the nearest sub-slices of the lower frequency channel holder 152 and higher frequency channel holder 154. Again, the optical signal detection function 72 recognizes that positions of the active signals (e.g., optical signal 164) within their respective MC bandwidth zones (e.g., MC bandwidth zone 146). From the known active zones (and based on other factors mentioned below), the holding zone generating function 74 partitions a lower frequency zone (e.g., first interfering zone 148) and a higher frequency zone (e.g., second interfering zone 150) from the channel holders 152, 154. Then, the interfering zone slope creation function 76 is configured to create the slopes 166, 174 by strategically reducing the power such that the wave shape of the sub-slices represented as channel holders 168, 176 within the interfering zones 148, 150, respectively, is formed such that the power slopes down toward the MC bandwidth zone 146.

Figure 11:
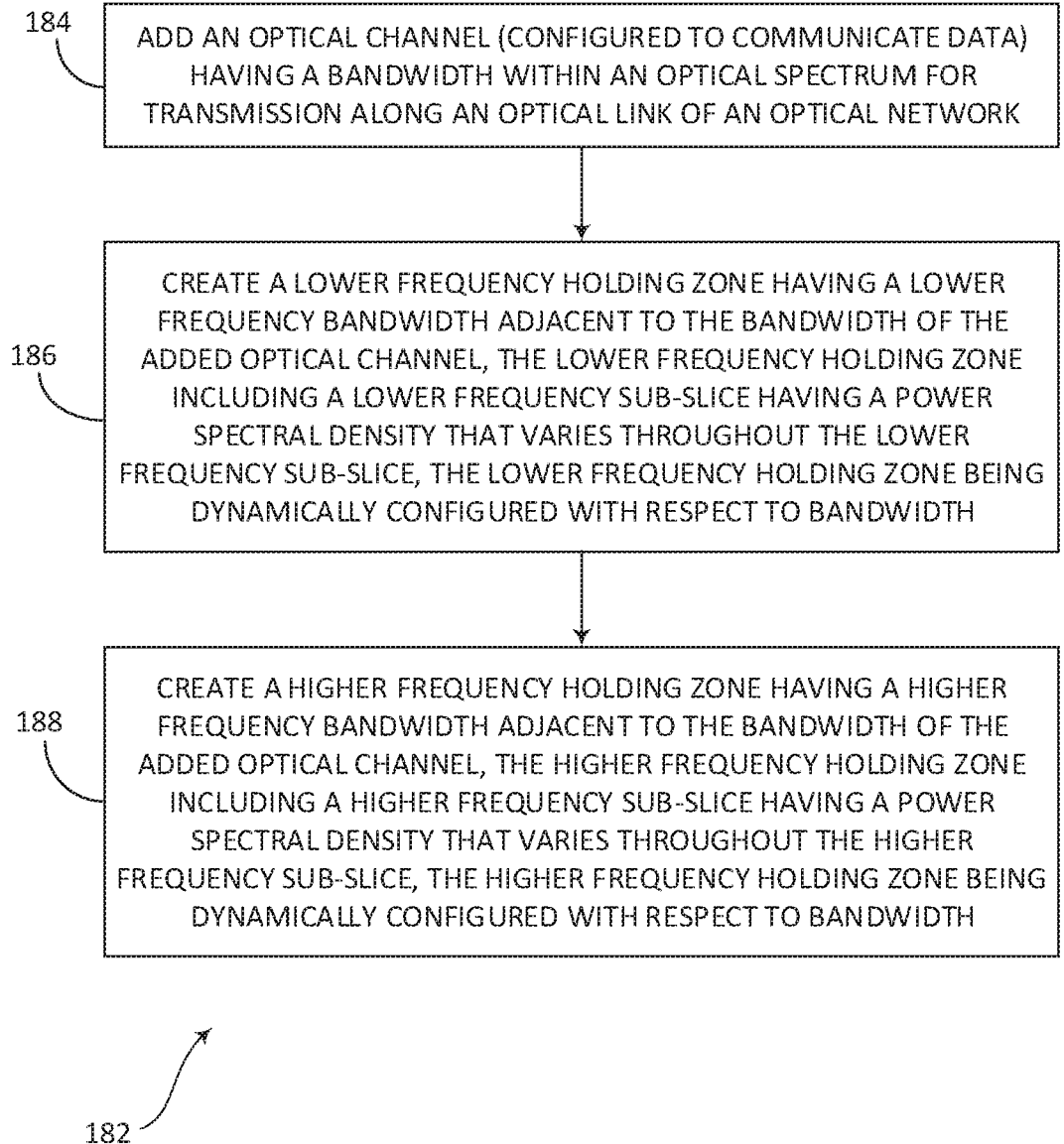
FIG. 11 is a flow diagram illustrating a method for reducing interference in channel holders when an optical channel is added, according to various embodiments of the present disclosure.

FIG. 11 is a flow diagram showing a method 182 for creating holding zones when an active optical channel is added. The method 182 includes a step of adding an optical channel (as indicated in block 184) having a bandwidth within an optical spectrum for transmission along an optical link of an optical network. For example, the optical channel may be configured to communicate data). The method 182 further includes the step of creating a lower frequency holding zone (as indicated in block 186) having a lower frequency bandwidth adjacent to the bandwidth of the added optical channel. The lower frequency holding zone includes a lower frequency sub-slice having a power spectral density that varies throughout the lower frequency sub-slice. Also, the method 182 includes creating a higher frequency holding zone (as indicated in block 188) having a higher frequency bandwidth adjacent to the bandwidth of the added optical channel. The higher frequency holding zone includes a higher frequency sub-slice having a power spectral density that varies throughout the higher frequency sub-slice. Regarding the creation of the lower and higher frequency holding zones, the method 182 is executed such that the lower frequency holding zone and the higher frequency holding zone are dynamically configured with respect to bandwidth, the link budget requirements, and/or available SNR margins of the added optical channels. For example, a higher Baud rate signal that transmits high capacity traffic may require high Required Optical Signal-to-Noise Ratio (ROSNR), which means that any small penalty from the line system can become significant from a link budget point-of-view to achieve the desired reach. In such case, in order to reduce interference penalties on the SNR margins, the holding zone can be widened for specific fiber types. However, if the added signal has enough margins and/or if the fiber type is different, then the respective holding zone bandwidths can be minimized.

According to addition implementations, the method 182 may further be defined whereby the lower frequency holding zone and higher frequency holding zone are dynamically configured as a function of a signal transmission mode of the optical link. For example, the signal transmission mode may include at least one of a modulation format, Baud rate, and line rate. Additionally, or alternatively, the lower frequency holding zone and higher frequency holding zone are dynamically configured as a function of the type of fiber utilized within the optical link and/or the span of the fiber across the optical link.

The method 182 may further be defined whereby the power spectral density of the lower frequency sub-slice decreases as it approaches the bandwidth of the added optical channel and the power spectral density of the higher frequency sub-slice decreases as it approaches the bandwidth of the added optical channel. Also, the method 182 may further include the step of increasing the power spectral density of the added optical channel to compensate for the power lost by the decrease in the lower frequency sub-slice and higher frequency sub-slice. The steps of creating the lower frequency holding zone (block 186) and creating the higher frequency holding zone (block 188) includes reducing noise, increasing the signal-to-noise ratio (SNR), and maintaining a constant power throughout the optical spectrum. The bandwidths of the lower frequency sub-slice and higher frequency sub-slice may be about 3.125 GHz, about 6.25 GHz, or other bandwidth less than about 6.25 GHz.

Furthermore, the lower frequency holding zone and higher frequency holding zone may be asymmetric. The lower frequency sub-slice and higher frequency sub-slice may be varied with a linear slope. The optical network may be configured to transmit optical signals in the C-band, L-band, and/or C+L-band. The steps of creating the lower frequency holding zone (block 186) and creating the higher frequency holding zone (block 188) includes dynamically configuring the lower frequency holding zone and higher frequency holding zone independently from other optical links within the optical network.

Figure 12:
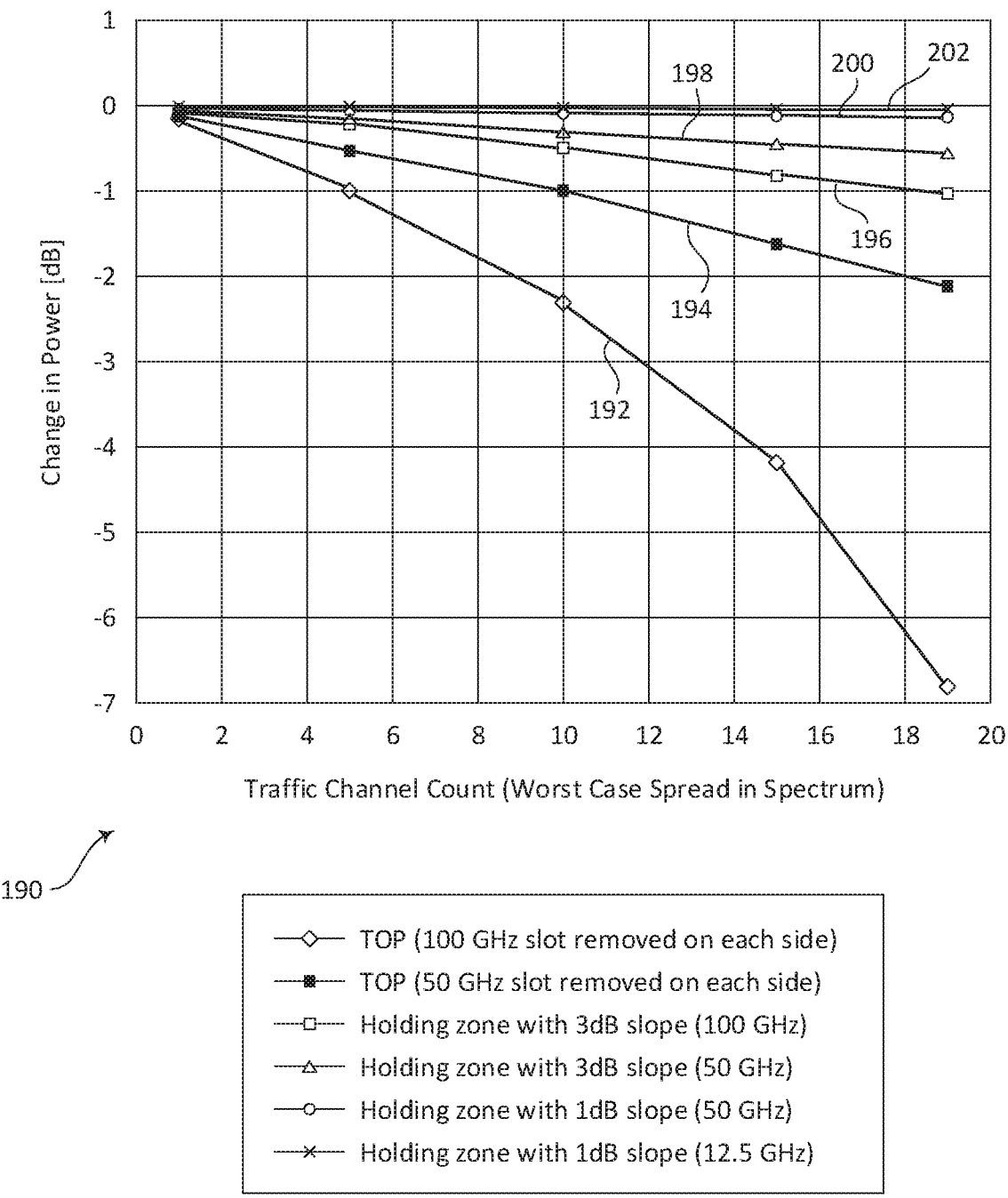
FIG. 12 is a graph showing the total launch power reduction using different channel holder injection processes described herein.

FIG. 12 is a graph 190 showing the total launch power reduction using different channel holder injection processes, such as those described above with respect to FIGS. 5, 6, 9, and 10. The graph 190 plots change in power (in dB) versus the worst case scenario of the traffic channel count based on a spread in the spectrum. The graph 190 compares the results of the various channel holder injection processes that may be performed by the ASE generator 48.

A first plot 192 (denoted by diamond marks) shows the results of the first channel holder injection technique described with respect to FIG. 5, based on the Total Output Power (TOP) when a two 50 GHz slots (a 100 GHz slot) is removed (and not replaced) on each side of the added channel, such as for a submarine optical communication system. A second plot 194 (denoted by solid square marks) shows the results of the first or second channel holder injection technique described with respect to FIGS. 5 and 6, based on the TOP when one 50 GHz slot is removed (and not replaced) on each side of the added channel, such as for a terrestrial optical communication system. A third plot 196 (denoted by square marks) shows the results of the third (preferred) channel holder injection technique described with respect to FIGS. 9 and 10, based on a holding zone sub-slice (e.g., zones 148 and 150) having a bandwidth of 100 GHz and a slope with a 3 dB maximum reduction. A fourth plot 198 (denoted by triangular marks) shows the results of the third (preferred) channel holder injection technique described with respect to FIGS. 9 and 10, based on a holding zone sub-slice (e.g., zones 148 and 150) having a bandwidth of 50 GHz and a slope with a 3 dB maximum reduction. A fifth plot 200 (denoted by circle marks) shows the results of the third (preferred) channel holder injection technique described with respect to FIGS. 9 and 10, based on a holding zone sub-slice (e.g., zones 148 and 150) having a bandwidth of 50 GHz and a slope with a 1 dB maximum reduction. A sixth plot 202 (denoted by X marks) shows the results of the third (preferred) channel holder injection technique described with respect to FIGS. 9 and 10, based on a holding zone sub-slice (e.g., zones 148 and 150) having a bandwidth of 12.5 GHz and a slope with a 1 dB maximum reduction.

Figure 13:
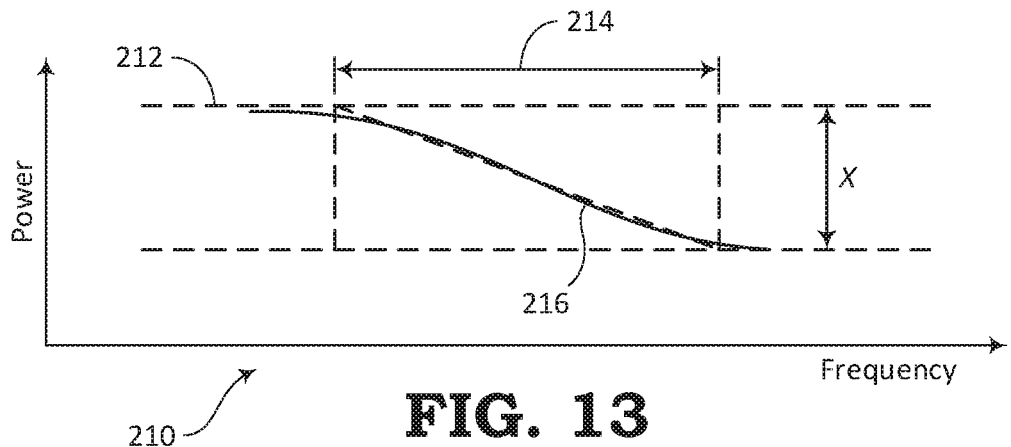
FIGS. 13-16 are graphs showing power and attenuation characteristics as a result of the execution of different channel holder injection processes.
Figure 14:
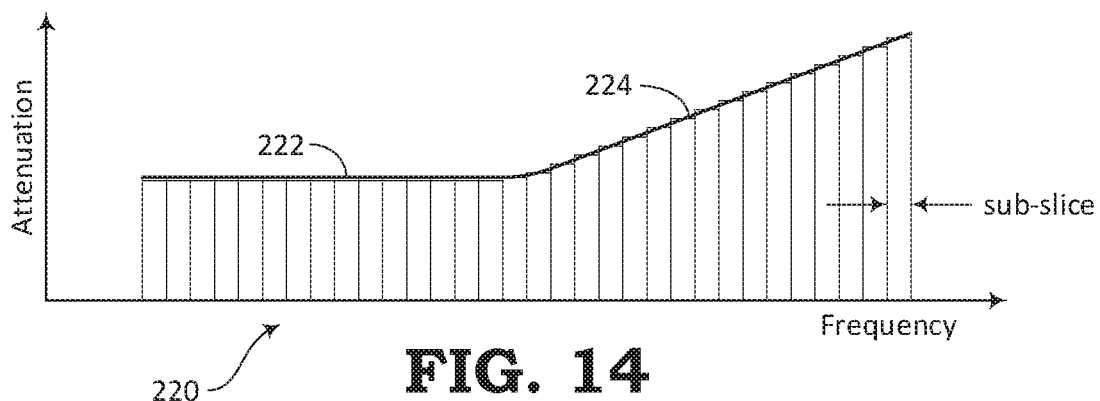
Figure 15:
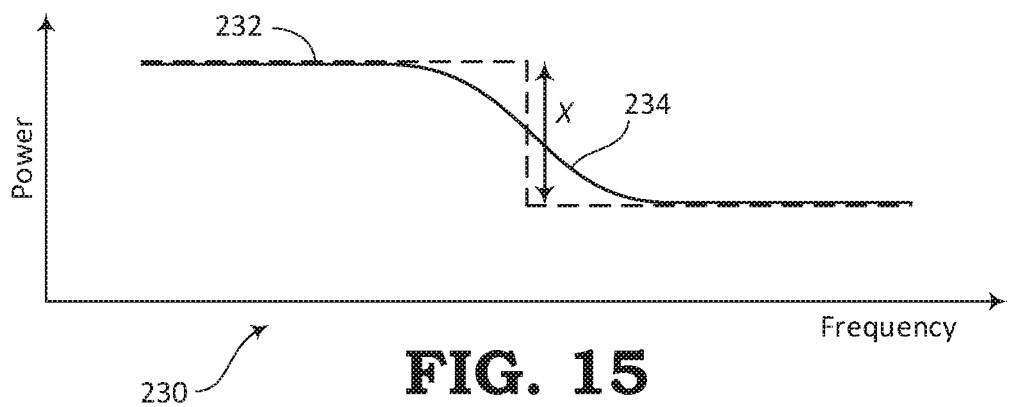
Figure 16:
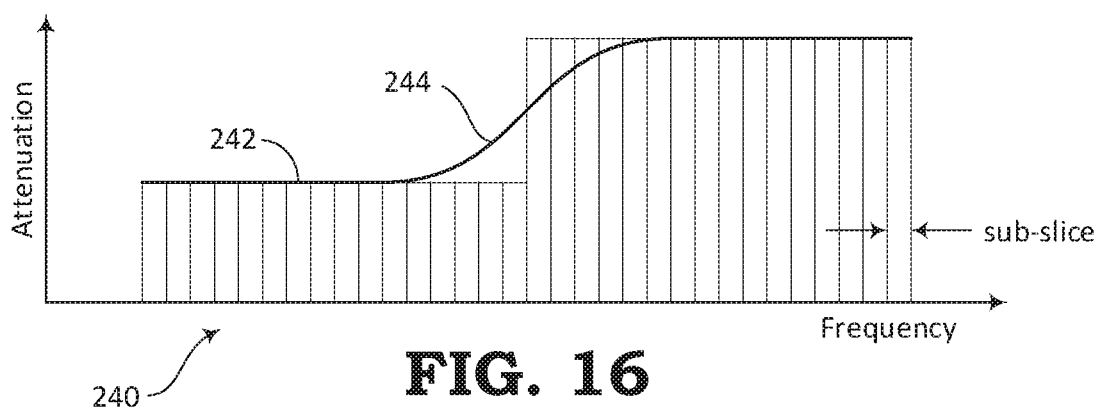

FIGS. 13-16 are graphs showing power and attenuation characteristics as a result of the execution of different channel holder injection processes. FIG. 13 shows a graph 210 of power versus frequency over a channel holding zone 214 or ASE interfering zone. The channel holder 216 starts at or near the target PSD launch profile level 212 and drops by a certain amount X, which may be about 3 dB. The channel holder 216 is able to achieve a measured power profile that very closely matches the target spectral shape. FIG. 14 shows a graph 220 of attenuation versus frequency due to the actual attenuation profile 224 due to filter roll-off. Level 222 shows the sub-slice attenuation value. The bandwidth of each sub-slice may be, for example, about 6.25 GHz. FIG. 15 shows a graph 230 of power versus frequency over a channel holding zone or ASE interfering zone. The channel holder 234 starts at or near the target PSD launch profile level 232 and drops by a certain amount X, which may be about 3 dB. The channel holding zones, preceding and following the drop, are created. the channel holder 234 shows the actual achieved measured power profile being off from the target spectral shape due to the filter roll-off of the sub-slices, which may be divided or partitioned by a Wavelength Selective Switch (WSS). FIG. 16 shows a graph 240 of attenuation versus frequency due to the actual attenuation profile 244 due to filter roll-off. Level 242 shows the sub-slice attenuation value. The bandwidth of each sub-slice may be, for example, about 6.25 GHz.

The present disclosure describes interference from ASE channel holders for certain fiber types, and for certain signal transmission modes. In channel holder based optical links, channelized ASEs are deployed in every optical links in order to calibrate the links for full-fill channel loading conditions, as well as, to cope with transient effects during capacity changes or for handling fiber faults. However, in some fiber types (such as NZDSF, TWRS), the interference from neighboring ASEs can be a significant source for non-linear noise propagation penalties that can limit the reach for certain signal types and their transmission modes.

Conventional methods may include removing fixed spectral slots of ASE holders from each side of a fixed grid signal from end to end that penalizes the actual benefit of deploying ASE holders in the first place. By doing that, the total power into the line system gets reduced from the target total launch power for which all the gain/loss actuators are calibrated, which introduces additional Stimulated Raman Scattering (SRS), ripple, and tilt on the spectrum and impacts the link budget performance of the added channels. By reducing non-linear penalties from ASE interference for certain fiber types and signal transmission modes, as described with respect to the various embodiments in the present disclosure, interference can be reduced without losing too much power into the line system and, hence, the full benefit of ASE channel holders. The methods described herein propose adding holding zones (e.g., utilizing ASE) on each side of a media channel (MC) that is a function of signal transmission modes and fiber types for an optical link (e.g., a section of an optical communication system from one OADM to the next). In addition, the methods consider the fact that the interference penalty from ASE-based channel holder injection will be gradually reduced the farther the channel holder gets from the data signal (in the MC), and hence, applies a gradually reduced power profile or spectral shape for channel holders over the holding zones.

The systems and methods described in the present disclosure provide an improvement over conventional systems in that the creation of channel holders does not necessarily need to be limited to fixed slots with fixed power but can take advantage of flexible grid hardware. Instead, the present systems and methods use dynamic and flexible ways to reduce interference for specific fiber types, without losing the full benefit of ASE channel holders for handling fiber fault and transient offsets during capacity changes. Only sub-slices neighboring the MC might provide minimal interference, where the present systems and method may consider the fiber span and signal transmission characteristics. Also, each Optical Multiplex Section (OMS) or OADM may operate independently of the other sections, based on fiber type and signal transmission characteristics. Using the systems described herein, the negative results of the interference is gradually reduced as the frequencies move farther from the signal.

The present disclosure also defines systems that are improvement over conventional systems with respect to the feature that the total power of the optical data signal in the MC is amplified to closely match the lost power from the sloped channel holder sub-slices adjacent to the MC. Thus, the present systems can keep the total power constant and allows a higher average PSD for the optical data signals over the neighboring ASE channel holder, which can be used to reduce the dB drop in the channel holder over the holder (interfering) zone.

The OADM of the present disclosure is able to create an ASE holding zone on each side of a media channel (MC) that is dynamic and flexible in terms of bandwidth, is a function of the signal and its transmission characteristics (such as modulation format, Baud rate, line rate etc.), and a function of fiber types within an optical multiplex section (OMS). Also, the OADM applies a gradually reduced power spectral shape for the ASE holders within the interfering zone. That is, the power spectral density (PSD) within the zone are gradually reduced as it gets closer to the MC. The gradual power spectral shape is applied considering the fact that the interference from the nearest ASE sub-slice (such as 3.125 GHz or 6.25 GHz) will have the highest impact, and the non-linear impact will diminish with the increase in spectral distance from the signal or MC edge.

The methods thus apply a drop of X dB (e.g. X=1 dB to 3 dB) on the nearest sub-slice from their original PSD target profile and then applies a gradual PSD tilt over the interfering zone, so that the last sub-slice will have a 0 dB drop from its original target PSD profile. In other words, if the interfering zone contains N sub-slices (the minimum spectral actuator slice that a WSS can accommodate), and the power on the nearest sub-slice has to be dropped by X dB to reduce the interference, then the applied power spectral shape over the zone will have a slope of $$\left(\frac{X}{N-1}\right);$$

where $$N = \frac{\text{one-sided Zone } BW}{WSS \text{ subslice } BW}$$

The method requires the use of flexible grid capable WSS hardware on the OADM mux that is at least capable of handling spectral actuators <=12.5 GHz. The ASE interfering zone is applied by the OADM multiplexer WSS unit in each optical multiplex section (OMS) and can be different from one OMS to the next. In addition, the methods may ensure that the total signal power is replaced with the total spectral ASE power removed by provisioning the MC, which means for the signal Network Media Channel (NMC) per Media Channel (MC) case, the average signal PSD will be higher than the average ASE PSD. This also helps to reduce the value of X over the interfering zone.

The channel holder systems are initially calibrated for full-fill channel loading conditions with ASE holders representing 100% spectral power of the total usable bandwidth. Thus, during capacity changes and fault handling, a reduction in ASE power following this initial calibration results in the system not having the intended 100% spectral power for the usable bandwidth and the pre-calibrated gain/loss actuators will not be 100% valid anymore to compensate for SRS, tilt, ripple, and other non-linear transient impacts. However, with the proposed method, for low channel count conditions, the ASE holder power is not reduced very much, and hence, the total power to the fiber remains fairly constant. This means that the pre-calibrated gain/loss actuators remain valid to compensate for SRS, tilt, ripple, etc. Also, the pre-existing and added channels do not experience that much power offset during capacity changes. If, for a specific fiber type in a section, the ASE interfering zone needs to be applied, it does not mean that the downstream OADM section will apply the same. Thus, during capacity changes, a power offset from one section (due to reduced total power from ASE interfering zones) will not propagate to the next section unless each section contains the same fiber type.

The approach of applying a gradual or weighted penalty on neighboring ASE holders, serves the benefit of having channel holders in the first place to reduce power offsets and SNR impacts on pre-existing channels over any capacity changes or during L0 restoration or for handling fiber faults scenarios losing subset of the spectrum. On a channel holder based optical link with plurality of OADM sections, a process may include finding a link that has a fiber type that will experience non-linear propagation penalty for a given signal and its modulation type (e.g. a TWC or TWRS fiber type). Once the channel is provisioned and traffic is running, the methods described herein may include determining if the power of the neighboring ASE holders drops by a few dB only for a fractional BW on each side (not the entire usable band, and not a complete power drop). Also, it is only dropped for the section that has the given fiber type. In addition, the methods include provide a power spectral shape that may be applied (such as a gradual shape or step function) for the neighboring ASE holders beside or next to the data signal. The present disclosure also includes determining if different signal types or their transmission characteristics trigger different amounts of interfering zone for which the ASE holder power is dropping in a given section.

The channel holding injection techniques described in the present disclosure are different from typical flex-grid channel dead-bands and guard-bands. In flexible grid implementations, any signal can have a dead-band and guard-band on each side, where: dead-band represents the bandwidth that needs to be allocated at each side of the signal to avoid OADM mux/demux filter roll-off penalties, dead-band is usually a property of the media channel, that means the bandwidth allocated for the dead-band cannot be used for any other traffic along the path, for channel provisioning, the dead-band is maintained end to end across the channel path for every mux and demux, and BW for dead-band can vary by signal type. Similarly, guard-band is applied between two network media channels (NMCs) within a media channel (MC) to reduce XPM (cross-phase modulation) between them. Again, the guard-band is maintained end to end across the channel path for every mux and demux. Guard-band is integrated within the MC BW i.e. the bandwidth allocated for the guard-band cannot be used for any other traffic along the path Compared to that, the ASE channel holder (interfering) zone created by the systems of the present disclosure may be based on a property of signal type and may be applied locally at an OADM mux only if the OADM section contains specific fiber types. The ASE holding (interfering) zone does not propagate from one section to next along the path. Each OADM mux decides on its own whether to apply an ASE zone or not. The approach is to avoid unnecessary power penalties to ASE holders along the path. The bandwidth allocated for the ASE zone is outside of the MC BW. The bandwidth may be available for other traffic if required and does not impede the spectral efficiency.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. An Optical Add/Drop Multiplexer (OADM) of an optical communication system, the OADM comprising:
   an Amplified Spontaneous Emission (ASE) generator and a multiplexer unit, wherein the multiplexer unit is configured to provide an added channel and a channel holder from the ASE generator on an optical link; and
   a controller configured to
      detect characteristics of the added channel on the optical link; and
      cause injection of the channel holder within unused bandwidth adjacent to the added channel for transmission along with the added channel on the optical link, wherein the unused bandwidth includes a holding zone located adjacent to the added channel, and wherein a shape of power spectral density of the channel holder is varied in the holding zone and left unchanged outside the holding zone.

2. The OADM of claim 1, wherein the controller is further configured to
   dynamically generate the shape as a function of a signal transmission mode in the optical link, the signal transmission mode including at least one of a modulation format, baud rate, and line rate.

3. The OADM of claim 1, wherein the controller is further configured to
   dynamically generate the shape as a function of the type of fiber utilized within the optical link and/or the span of the fiber across one or more of the optical link and the span fibers of an optical multiplex section.

4. The OADM of claim 1, wherein the controller is further configured to
   cause creation of a lower frequency holding zone filling a lower frequency of the unused bandwidth adjacent to a bandwidth of the added channel and to create a higher frequency holding zone filling a higher frequency of the unused bandwidth adjacent to the bandwidth of the added channel.

5. The OADM of claim 4, wherein the controller is further configured to
   cause partitioning of the lower frequency holding zone to configure at least one lower frequency sub-slice and varying a power spectral density of the lower frequency sub-slice, and
   cause partitioning of the higher frequency holding zone to configure at least one higher frequency sub-slice and varying a power spectral density of the higher frequency sub-slice.

6. The OADM of claim 5, wherein the controller is further configured to
   cause variation of the power spectral density of the lower frequency sub-slice and the power spectral density of the higher frequency sub-slice such that the power spectral density decreases as the respective sub-slice approaches the bandwidth of the added channel.

7. The OADM of claim 1, wherein the ASE generator is configured to achieve ASE generation and to perform ASE injection using a Wavelength Selective Switch (WSS) or a spectral switching and shaping module at the multiplexer unit.

8. A method comprising the steps of:
adding an optical channel having a bandwidth within an optical spectrum for transmission along an optical link of an optical network;
adding a first channel holder and a second channel holder within unused bandwidth on the optical link;
creating a lower frequency holding zone for the first channel holder having a lower frequency bandwidth adjacent to the bandwidth of the added optical channel, the first channel holder including at least one lower frequency sub-slice having a power spectral density that varies throughout the lower frequency sub-slice and is unchanged outside of the lower frequency holding zone; and
creating a higher frequency holding zone for the second channel holder having a higher frequency bandwidth adjacent to the bandwidth of the added optical channel, the second channel holder including at least one higher frequency sub-slice having a power spectral density that varies throughout the higher frequency sub-slice and is unchanged outside of the lower frequency holding zone;
wherein the lower frequency holding zone and the higher frequency holding zone bandwidths are dynamically configured with respect to one or more of link budget requirements and available signal-to-noise ratio (SNR) margins of the optical channel.

9. The method of claim 8, wherein the lower frequency holding zone and higher frequency holding zone are dynamically configured as a function of a signal transmission mode of the optical link, and wherein the signal transmission mode includes at least one of a modulation format, Baud rate, and line rate.

10. The method of claim 8, wherein the lower frequency holding zone and higher frequency holding zone are dynamically configured as a function of a type of fiber utilized within one or more of the optical link and a span of the fiber across the optical link.

11. The method of claim 8, wherein the power spectral density of the lower frequency sub-slice decreases as it approaches the bandwidth of the added optical channel and the power spectral density of the higher frequency sub-slice decreases as it approaches the bandwidth of the added optical channel.

12. The method of claim 11, further comprising increasing the power spectral density of the added optical channel to compensate for the power lost by the decrease in the lower frequency sub-slice and higher frequency sub-slice.

13. The method of claim 8, wherein the bandwidths of the lower frequency sub-slice and higher frequency sub-slice are a minimum spectral actuator slice that a Wavelength Selective Switch (WSS) or spectral shaping device can handle on the multiplexer.

14. The method of claim 8, wherein the lower frequency holding zone and higher frequency holding zone are asymmetric.

15. The method of claim 8, wherein the power spectral density shapes of the at least one lower frequency sub-slice and the power spectral density shapes of the at least one higher frequency sub-slice are varied with a linear slope, a non-linear slope, or a step function.

16. The method of claim 8, wherein the optical network is configured to transmit optical signals in one or more of C-band, L-band, and C+L-band.

17. The method of claim 8, wherein the steps of creating the lower frequency holding zone and creating the higher frequency holding zone include dynamically configuring the lower frequency holding zone and higher frequency holding zone independently from other optical links or OADM sections within the optical network.

18. The OADM of claim 1, wherein the shape of power spectral density of the channel holder is varied in the holding zone via any of a linear slope, a non-linear slope, or a step function.

19. The OADM of claim 1, wherein the holding zone for the OADM is configured independently from other optical links or OADM sections within the optical communication system.

20. The OADM of claim 4, wherein the lower frequency holding zone and higher frequency holding zone are asymmetric.

* * * * *